United States Patent
van der Weele

(10) Patent No.: US 10,844,216 B2
(45) Date of Patent: Nov. 24, 2020

(54) POLYMER COMPOSITION COMPRISING POLY(BUTYLENE TEREPHTHALATE)

(71) Applicant: SABIC GLOBAL TECHNOLOGIES B.V., Bergen op Zoom (NL)

(72) Inventor: Chris van der Weele, Sommelsdijk (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 104 days.

(21) Appl. No.: 16/326,076

(22) PCT Filed: Aug. 8, 2017

(86) PCT No.: PCT/EP2017/070004
§ 371 (c)(1),
(2) Date: Feb. 15, 2019

(87) PCT Pub. No.: WO2018/036803
PCT Pub. Date: Mar. 1, 2018

(65) Prior Publication Data
US 2019/0185661 A1  Jun. 20, 2019

(30) Foreign Application Priority Data
Aug. 25, 2016  (EP) .................................. 16185658

(51) Int. Cl.
| | | |
|---|---|---|
| C08L 67/02 | (2006.01) | |
| C08K 7/14 | (2006.01) | |
| C08L 23/06 | (2006.01) | |
| C08G 63/183 | (2006.01) | |
| C08K 3/34 | (2006.01) | |

(52) U.S. Cl.
CPC ............... *C08L 67/02* (2013.01); *C08K 7/14* (2013.01); *C08L 23/06* (2013.01); *C08G 63/183* (2013.01); *C08K 3/34* (2013.01); *C08K 2201/003* (2013.01); *C08K 2201/004* (2013.01); *C08K 2201/005* (2013.01); *C08L 2203/20* (2013.01); *C08L 2205/025* (2013.01); *C08L 2207/062* (2013.01); *C08L 2207/066* (2013.01)

(58) Field of Classification Search
CPC ............ C08L 2205/00; C08L 2205/02; C08L 2205/025; C08L 2205/03; C08L 2205/035; C08L 2205/04; C08L 2205/06; C08L 2205/08; C08L 2205/12; C08L 2205/14; C08L 2205/16; C08L 2205/24; C08L 2205/242; C08L 2207/00; C08L 2207/02; C08L 2207/04; C08L 2207/06; C08L 2207/062; C08L 2207/064; C08L 2207/066; C08L 2207/068; C08L 2207/07; C08L 2203/20; C08L 2203/202; C08L 2203/204; C08L 2203/206; C08L 23/00; C08L 23/02; C08L 23/025; C08L 23/04; C08L 23/06; C08L 23/08; C08L 23/0807; C08L 23/0815; C08L 23/0823; C08L 23/083; C08L 23/0838; C08L 67/00; C08L 67/02; C08L 67/025; C08K 7/00; C08K 7/02; C08K 7/04; C08K 7/14; C08G 63/00; C08G 63/02; C08G 63/12; C08G 63/16; C08G 63/18; C08G 63/181; C08G 63/183; C08G 63/40; C08G 63/42; C08G 63/66; C08G 63/668
See application file for complete search history.

(56) References Cited

U.S. PATENT DOCUMENTS

| | | | | |
|---|---|---|---|---|
| 4,185,047 A | * | 1/1980 | Cohen | C08K 3/34 525/94 |
| 4,369,280 A | | 1/1983 | Dieck et al. | |
| 4,373,047 A | * | 2/1983 | Cohen | C08K 5/06 524/371 |
| 4,476,274 A | * | 10/1984 | Liu | C08L 67/02 523/521 |
| 2007/0060678 A1 | * | 3/2007 | Wenz | C08L 2666/02 524/115 |
| 2011/0319536 A1 | * | 12/2011 | Ding | C08L 67/02 524/101 |
| 2014/0031454 A1 | * | 1/2014 | Alidedeoglu | C08L 67/06 523/455 |
| 2014/0242315 A1 | | 8/2014 | Yamada | |

(Continued)

FOREIGN PATENT DOCUMENTS

| | | |
|---|---|---|
| CN | 103525020 A | 1/2014 |
| EP | 0984027 A1 | 3/2000 |
| EP | 2177567 A1 | 4/2010 |

(Continued)

OTHER PUBLICATIONS

Microthene FN510 technical data sheet, download Aug. 3, 2020. (Year: 2020).*
International Search Report for International Application No. PCT/EP2017/070004; International Filing Date Aug. 8, 2017; dated Aug. 23, 2017; 6 pages.
Written Opinion for International Application No. PCT/EP2017/070004; International Filing Date Aug. 8, 2017; dated Aug. 8, 2017; 7 pages.

*Primary Examiner* — Christopher M Rodd
(74) *Attorney, Agent, or Firm* — Cantor Colburn LLP

(57) ABSTRACT

The present invention relates to a polymer composition comprising: a. poly(butylene terephthalate); b. glass fibres; and c. 1.5-10.0 wt % polyethylene with regard to the total weight of the polymer composition. Such polymer composition provides a desired combination of properties to enable the use in the production of thin-walled connectors, in that such polymer composition has a desirably high heat deflection temperature, good melt flow properties, high Charpy impact strength and high tensile strain at break.

15 Claims, No Drawings

(56) References Cited

U.S. PATENT DOCUMENTS

2019/0185619 A1    6/2019  Yang

FOREIGN PATENT DOCUMENTS

WO        8000255        2/1980
WO     2016202607 A1   12/2016

* cited by examiner

POLYMER COMPOSITION COMPRISING POLY(BUTYLENE TEREPHTHALATE)

CROSS REFERENCE TO RELATED APPLICATIONS

This application is a National Stage application of PCT/EP2017/070004, filed Aug. 8, 2017, which claims the benefit of European Application No. 16185658.8, filed Aug. 25, 2016, both of which are incorporated by reference in their entirety herein.

The present invention relates to a polymer composition comprising poly(butylene terephthalate). The invention also relates to connectors comprising such polymer composition.

Polymer compositions comprising poly(butylene terephthalate), also referred to as PBT, are commonly used in the production of articles, such as injection moulded articles. Such articles may find their use amongst others in automotive applications, since PBT has particularly favourable properties for such applications. Such favourable properties include for example dimensional stability, allowing for the production of moulded objects with a high dimensional accuracy, and high heat resistance.

A particular application where polymer compositions comprising poly(butylene terephthalate) are suitable is in the production of connectors for electrical and electronical (E&E) applications, in particular for automotive E&E applications.

It is an ongoing development in the field of connectors for automotive E&E applications to seek for reduction of the quantity of polymer used in the production of such connector, whilst maintaining the desired product quality. One parameter by which the product quality of connectors for automotive E&E applications is determined is the durability of the connecting elements in the connector. In a preferred embodiment, a connector comprises at least two individual elements, being a plug, also referred to as a male end, and a jack, also referred to as a female end. The connector plug and the connector jack may be connected together to form the connector. The connector may comprise electrically conductive elements in both the jack and plug, which connect to each other and which are connected to electrical wires, thus providing a means of connecting one electrical wire with another whilst allowing the electrical signals to be transported via the connector.

As a result of the ongoing desire for reduction of the quantity of polymer composition used to manufacture a connector, the wall thickness of the connector is also reduced. For example, the wall thickness of the connectors may be ≤0.5 mm. The reduction of thickness is also applicable to the thickness of the connecting elements, such as hinges, in the connector. Such hinges should be sufficiently strong as well as flexible to allow easy connecting and disconnecting of the plug and the jack in the connector, where at the same time the elements making up the hinge should not fracture. Also, the hinge needs to be sufficiently strong to avoid undesired unfastening of the connector plug from the connector jack.

In order to define the polymer composition to be suitable for the production of thin-walled automotive E&E connectors, the polymer composition needs to have a desired high balance of material properties. In particular, the polymer composition needs to have a desired high balance of impact strength, melt flow, heat resistance and tensile properties.

Polymer compositions for use in thin-walled automotive E&E connectors have been reported in for example US20140242315A1, where poly(butylene terephthalate) compositions are presented comprising 50-90 wt % of a poly(butylene terephthalate) having an intrinsic viscosity of 0.90 dl/g or less, 10-50 wt % inorganic filler, and 0.05-3 parts by weight of triglycerin stearate partial ester.

However, such polymer compositions do not present a sufficiently suitable combination of the properties required for use in the above presented thin-walled automotive connector applications, where in particular a combination of a particularly good melt flow properties, a high heat deflection temperature, a high Charpy impact strength and a high tensile strain at break are required. The good melt flow properties are required to ensure that the moulding process may be performed in a fast way, whilst still allowing for the production of moulded objects having a desirably thin-walled construction. The high heat-deflection temperature is required to ensure the connectors may be used in high temperature conditions, such as in automotive under-the-hood applications, without losing the intended functionality. The high tensile strain at break as required to ensure that the hinges by means of which the jack and the plug of the connectors are connected may be fastened and disconnected sufficiently frequent to allow for the installation, replacement and disconnection of the connectors during the normal use of the connectors.

It is particularly desirable that polymer compositions for use in thin-walled automotive connectors have a melt volume flow rate as determined in accordance with ISO 1133-1 (2011) at 250° C. at a load of 2.16 kg of ≥24 g/10 min, such as 24-32 g/10 min, a heat deflection temperature as determined in accordance with ISO 75-2 (2013), method B, of ≥180° C., a Charpy notched impact strength as determined in accordance with ISO 179 (2000) at 23° C. of ≥4.0 kg/m$^2$, and a tensile strain at break as determined in accordance with ISO 527-1 (2012) at a speed of 5 mm/min of ≥3.0%.

Such desired combination of good melt flow properties, a high heat deflection temperature, a high Charpy impact strength and a high tensile strain at break are now achieved by the present invention by a polymer composition comprising:

a. poly(butylene terephthalate);
   b. glass fibres; and
   c. 1.5-10.0 wt % polyethylene
with regard to the total weight of the polymer composition.

Such polymer composition provides the desired combination of properties to enable the use in the production of thin-walled connectors, in that such polymer composition has a desirably high heat deflection temperature, good melt flow properties, high Charpy impact strength and high tensile strain at break.

The polymer composition may comprise 50.0-95.0 wt % of poly(butylene terephthalate), alternatively 60.0-90.0 wt %, more preferably 80.0-90.0 wt %, with regard to the total weight of the polymer composition.

The polymer composition may comprise 5.0-15.0 wt % of glass fibres, alternatively 8.0-12.0 wt %, more preferably 8.5-11.5 wt %, with regard to the total weight of the polymer composition.

The polymer composition comprises 1.5-10.0 wt % of polyethylene, preferably 1.5-7.0 wt %, more preferably 1.5-5.0 wt %, with regard to the total weight of the polymer composition.

Preferably, the polymer composition comprises:

a. 80.0-90.0 wt % poly(butylene terephthalate);
   b. 8.5-11.5 wt % glass fibres; and
   c. 1.5-10.0 wt % polyethylene with regard to the total weight of the polymer composition.

The poly(butylene terephthalate) as used in the polymer composition of the present invention may for example be a poly(butylene terephthalate) homopolymer, alternatively the poly(butylene terephthalate) may be a poly(butylene terephthalate) copolymer. Such poly(butylene terephthalate) homopolymer may consist of polymeric units derived from 1,4-butanediol and terephthalic acid or dimethyl terephthalate. Such poly(butylene terephthalate) copolymer may comprise polymeric units derived from 1,4-butanediol and terephthalic acid or dimethyl terephthalate. Such poly(butylene terephthalate) copolymer may further comprise a quantity of polymeric units derived from further monomers. Such further monomers may for example by dicarboxylic acids or esters thereof other than terephthalic acid or dimethyl terephthalate, such as for example isophthalic acid, or naphthalene dicarboxylic acid. Such further monomers may also in exemplary embodiments be diols other than 1,4-butanediol, such as for example ethanediol, 1,3-propanediol or cyclohexanedimethanol.

For example, such poly(butylene terephthalate) copolymer may comprise ≤10.0 wt % of polymeric units derived from further monomers, preferably ≤5.0 wt %, such as ≥0.5 and ≤5.0 wt %, with regard to the total weight of the poly(butylene terephthalate).

In a particular embodiment, the poly(butylene terephthalate) copolymer comprises polymeric units derived from 1,4-butanediol and terephthalic acid or dimethyl terephthalate, and further ≥0.5 and ≤5.0 wt % polymeric units derived from isophthalic acid.

It is preferred that the poly(butylene terephthalate) has an intrinsic viscosity of ≥0.50 and ≤2.00 dl/g, for example ≥0.70 ands ≤1.00 dl/g, as determined in accordance with ASTM D2857-95 (2007).

In a further particular embodiment, the poly(butylene terephthalate) may comprise different poly(butylene terepthalates) having different product properties. For example, the poly(butylene terephthalate) may comprise a first poly(butylene terephthalate) and a second poly(butylene terephthalate). The poly(butylene terephthalate) may for example be a blend of such first poly(butylene terephthalate) and such second poly(butylene terephthalate). Such blend may be obtained by melt mixing of a mixture comprising the first poly(butylene terephthalate) and the second poly(butylene terephthalate). Alternatively, such blend may be obtained by mixing granules or powder particles of the first poly(butylene terephthalate) and the second poly(butylene terephthalate) in the solid state.

The first poly(butylene terephthalate) may for example have an intrinsic viscosity of 0.50-1.00 dl/g, alternatively 0.70-0.80 dl/g. The second poly(butylene terephthalate) may for example have an intrinsic viscosity of 1.00-1.50 dl/g, alternatively 1.15-1.40 dl/g. Preferably, the first poly(butylene terephthalate) has an intrinsic viscosity of 0.50-1.00 dl/g and the second poly(butylene terephthalate) has an intrinsic viscosity of 1.00-1.50 dl/g. More preferably, the first poly(butylene terephthalate) has an intrinsic viscosity of 0.70-0.80 dl/g and the second poly(butylene terephthalate) has an intrinsic viscosity of 1.15-1.40 dl/g.

The use of such blend of such first poly(butylene terephthalate) and such second poly(butylene terephthalate) allows for the preparation of blends having a desired intrinsic viscosity of the blend.

In a preferred embodiment of the invention, the poly(butylene terephthalate) comprises 50.0-90.0 wt % of the first poly(butylene terephthalate), with regard to the total weight of the poly(butylene terephthalate). More preferably, the poly(butylene terephthalate) comprises 70.0-85.0 wt % of the first poly(butylene terephthalate).

Further preferably, the poly(butylene terephthalate) comprises 10.0-50.0 wt % of the second poly(butylene terephthalate), with regard to the total weight of the poly(butylene terephthalate). More preferably, the poly(butylene terephthalate) comprises 15.0-30.0 wt % of the second poly(butylene terephthalate). In a particularly preferred embodiment, the poly(butylene terephthalate) comprises 70.0-85.0 wt % of the first poly(butylene terephthalate) and 15.0-30.0 wt % of the second poly(butylene terephthalate) with regard to the total weight of the poly(butylene terephthalate). For example, the poly(butylene terephthalate) may comprise 70.0-85.0 wt % of a first poly(butylene terephthalate) having an intrinsic viscosity of 0.70-0.80 dl/g, and 15.0-30.0 wt % of a second poly(butylene terephthalate) having an intrinsic viscosity of 1.15-1.40 dl/g.

The use of such poly(butylene terephthalate) is understood to contribute to the desired melt volume flow rate of the polymer composition of the invention.

The glass fibres used in the polymer composition according to the present invention may be example be chopped glass fibres. The glass fibres may for example have an average diameter of 5.0-15.0 µm, alternatively 7.5-12.5 µm. The glass fibres may for example have an average fibre length of 3.0-5.0 mm, preferably 3.5-4.5 mm. The glass fibres may for example comprise E-glass in accordance with ASTM D578-98, an alumina-borosilicate glass comprising ≤1.0 wt % alkali oxides with regard to the total weight of the glass. The glass fibres further may comprise one or more coatings, such as silane coatings.

Preferably, the glass fibres have an average diameter of 5.0-15.0 µm and an average fibre length of 3.0-5.0 mm. More preferably, the glass fibres have an average diameter of 7.5-12.5 µm and an average fibre length of 3.5-4.5 mm. Even more preferably, the glass fibres have an average diameter of 7.5-12.5 µm and an average fibre length of 3.5-4.5 mm, and comprise alumina-borosilicate glass comprising ≤1.0 wt % alkali oxides with regard to the total weight of the glass.

The polyethylene that is used in the polymer composition of the present invention may be one selected from a high-density polyethylene, a linear low-density polyethylene, a low-density polyethylene, or combinations thereof. Such polyethylenes are well known in the art and for example described in 'Handbook of Polyethylene', A. Peacock, Marcel Dekker, New York, 2000.

Such high-density polyethylene may for example have a density of 940-970 kg/m$^3$. Such linear low-density polyethylene may for example have a density of 900-940 kg/m$^3$, preferably 915-939 kg/m$^3$. Such low density polyethylene may for example have a density of 910-940 kg/m$^3$, preferably 915-930 kg/m$^3$, more preferably 918-922 kg/m$^3$. The density of the polyethylenes is determined in accordance with ISO 1183-1 (2012), method A.

It is preferred that the polyethylene is selected from a high-density polyethylene having a density of 940-970 kg/m$^3$, a linear low-density polyethylene having a density of 915-939 kg/m$^3$, or a low-density polyethylene having a density of 910-940 kg/m$^3$, wherein the density is determined in accordance with ISO 1183-1 (2012), method A.

It is particularly preferred that the polyethylene is a low-density polyethylene having a density of 918-922 kg/m$^3$ as determined in accordance with ISO 1183-1 (2012), method A.

The low-density polyethylene preferably has a zero-shear viscosity as determined using DMS with fit according to the Cross-model of ≥10000 Pa·s, more preferably ≥15000 Pa·s.

The polyethylene may for example have a melt mass-flow rate as determined in accordance with ISO 1133-1 (2011) at a temperature of 190° C. and a load of 2.16 kg of ≥10.0 and ≤50.0 g/10 min, alternatively ≥15.0 and ≤30.0 g/10 min, alternatively ≥20.0 and ≤25.0 g/10 min. The polyethylene may for example have a melt mass-flow rate as determined in accordance with ISO 1133-1 (2011) at a temperature of 190° C. and a load of 5.0 kg of ≥50.0 and ≤100.0 g/10 min, alternatively ≥70.0 and ≤85.0 g/10 min. Preferably, the polyethylene has a melt mass-flow rate determined at 190° C. under a load of 2.16 kg of ≥15.0 ands ≤30.0 g/10 min, and a melt mass-flow rate determined at 190° C. under a load of 5.0 kg of ≥50.0 and ≤100.0 g/10 min. Alternatively, the polyethylene may have a melt mass-flow rate determined at 190° C. under a load of 2.16 kg of ≥20.0 ands ≤25.0 g/10 min, and a melt mass-flow rate determined at 190° C. under a load of 5.0 kg of ≥70.0 ands ≤85.0 g/10 min.

Preferably, the polyethylene is a low-density polyethylene having a density of 918-922 kg/m$^3$ as determined in accordance with ISO 1183-1 (2012), method A, having a melt mass-flow rate determined at 190° C. under a load of 2.16 kg of ≥20.0 ands ≤25.0 g/10 min, and a melt mass-flow rate determined at 190° C. under a load of 5.0 kg of ≥70.0 ands ≤85.0 g/10 min.

Particularly preferable, the polymer composition comprises 1.5-5.0 wt %, with regard to the total weight of the polymer composition of polyethylene being a low-density polyethylene having a density of 918-922 kg/m$^3$ as determined in accordance with ISO 1183-1 (2012), method A, having a melt mass-flow rate determined at 190° C. under a load of 2.16 kg of ≥20.0 ands ≤25.0 g/10 min, and a melt mass-flow rate determined at 190° C. under a load of 5.0 kg of ≥70.0 and ≤85.0 g/10 min.

The use of such polyethylene in the polymer composition of the present invention is understood to contribute to achieving the desired tensile strain at break, the desired Charpy impact strength, and the desired heat deflection temperature.

The polymer composition according to the present invention further may comprise a quantity of talc. For example, the polymer composition may comprise 0.1-3.0 wt % of talc, alternatively 0.1-2.0 wt %, 0.1-1.0 wt %, or 0.1-0.5 wt %, with regard to the total weight of the polymer composition. Such talc may for example have an average particle size determined as $D_{50}$ according to ISO 9276-2 (2014) of ≤3000 nm, such as 500-1500 nm.

In a particular embodiment, the polymer composition according to the present invention comprises 0.1-1.0 wt % talc having an average particle size determined as $D_{50}$ according to ISO 9276-2 (2014) of 500-1500 nm, with regard to the total weight of the polymer composition.

The use of such talc may further contribute to the desired high heat deflection temperature of the polymer composition.

The invention also encompasses a particular embodiment wherein the polymer composition comprises:
  a. 80.0-90.0 wt % poly(butylene terephthalate) comprising 70.0-85.0 wt % of the first poly(butylene terephthalate) and 15.0-30.0 wt % of the second poly(butylene terephthalate) with regard to the total weight of the poly(butylene terephthalate);
  b. 8.5-11.5 wt % glass fibres;
  c. 1.5-10.0 wt % polyethylene; and
  d. 0.1-1.0 wt % talc having an average particle size determined as $D_{50}$ according to ISO 9276-2 (2014) of 500-1500 nm;
with regard to the total weight of the polymer composition.

In a further embodiment, the polymer composition comprises:
  a. 80.0-90.0 wt % poly(butylene terephthalate) comprising 70.0-85.0 wt % of a first poly(butylene terephthalate) having an intrinsic viscosity of 0.70-0.80 dl/g, and 15.0-30.0 wt % of a second poly(butylene terephthalate) having an intrinsic viscosity of 1.15-1.40 dl/g;
  b. 8.5-11.5 wt % glass fibres;
  c. 1.5-10.0 wt % polyethylene; and
  d. 0.1-1.0 wt % talc having an average particle size determined as $D_{50}$ according to ISO 9276-2 (2014) of 500-1500 nm;
with regard to the total weight of the polymer composition.

Another embodiment relates to a polymer composition comprising:
  a. 80.0-90.0 wt % poly(butylene terephthalate);
  b. 8.5-11.5 wt % glass fibres;
  c. 1.5-5.0 wt % polyethylene being a low-density polyethylene having a density of 918-922 kg/m$^3$ as determined in accordance with ISO 1183-1 (2012), method A; and
  d. 0.1-1.0 wt % talc having an average particle size determined as $D_{50}$ according to ISO 9276-2 (2014) of 500-1500 nm;
with regard to the total weight of the polymer composition.

A more particular embodiment of the present invention relates to a polymer composition comprising:
  a. 80.0-90.0 wt % poly(butylene terephthalate);
  b. 8.5-11.5 wt % glass fibres;
  c. 1.5-5.0 wt % polyethylene being a low-density polyethylene having a density of 918-922 kg/m$^3$ as determined in accordance with ISO 1183-1 (2012), method A, having a melt mass-flow rate determined at 190° C. under a load of 2.16 kg of ≥20.0 and ≤25.0 g/10 min, and a melt mass-flow rate determined at 190° C. under a load of 5.0 kg of ≥70.0 and ≤85.0 g/10 min; and
  d. 0.1-1.0 wt % talc having an average particle size determined as $D_{50}$ according to ISO 9276-2 (2014) of 500-1500 nm;
with regard to the total weight of the polymer composition.

Particularly, the invention also encompasses an embodiment relating to a polymer composition comprising:
  a. 80.0-90.0 wt % poly(butylene terephthalate) comprising 70.0-85.0 wt % of a first poly(butylene terephthalate) having an intrinsic viscosity of 0.70-0.80 dl/g, and 15.0-30.0 wt % of a second poly(butylene terephthalate) having an intrinsic viscosity of 1.15-1.40 dl/g;
  b. 8.5-11.5 wt % glass fibres;
  c. 1.5-5.0 wt % polyethylene being a low-density polyethylene having a density of 918-922 kg/m$^3$ as determined in accordance with ISO 1183-1 (2012), method A, having a melt mass-flow rate determined at 190° C. under a load of 2.16 kg of ≥20.0 and ≤25.0 g/10 min, and a melt mass-flow rate determined at 190° C. under a load of 5.0 kg of ≥70.0 and ≤85.0 g/10 min; and
  d. 0.1-1.0 wt % talc having an average particle size determined as $D_{50}$ according to ISO 9276-2 (2014) of 500-1500 nm;

with regard to the total weight of the polymer composition.

In yet a further embodiment, the invention relates to a polymer composition comprising:
a. 80.0-90.0 wt % poly(butylene terephthalate) comprising 70.0-85.0 wt % of a first poly(butylene terephthalate) having an intrinsic viscosity of 0.70-0.80 dl/g, and 15.0-30.0 wt % of a second poly(butylene terephthalate) having an intrinsic viscosity of 1.15-1.40 dl/g;
b. 8.5-11.5 wt % glass fibres having an average fibre diameter of 5.0-15.0 μm, and an average fibre length of 3.0-5.0 mm;
c. 1.5-5.0 wt % polyethylene being a low-density polyethylene having a density of 918-922 kg/m$^3$ as determined in accordance with ISO 1183-1 (2012), method A, having a melt mass-flow rate determined at 190° C. under a load of 2.16 kg of ≥20.0 and ≤25.0 g/10 min, and a melt mass-flow rate determined at 190° C. under a load of 5.0 kg of ≥70.0 and ≤85.0 g/10 min; and
d. 0.1-1.0 wt % talc having an average particle size determined as $D_{50}$ according to ISO 9276-2 (2014) of 500-1500 nm;
with regard to the total weight of the polymer composition.

The present invention in further embodiments also relates to a connector for connecting electric and electronic cables comprising the polymer composition; in particular, it also relates to a connector has a wall thickness of s 0.5 mm.

Particularly, the invention in one of its embodiments relates to a connector for connecting electric and electronic cables, the connector having a wall thickness of ≤0.5 mm, comprising a polymer composition comprising:
a. 80.0-90.0 wt % poly(butylene terephthalate) comprising 70.0-85.0 wt % of the first poly(butylene terephthalate) and 15.0-30.0 wt % of the second poly(butylene terephthalate) with regard to the total weight of the poly(butylene terephthalate);
b. 8.5-11.5 wt % glass fibres;
c. 1.5-10.0 wt % polyethylene; and
d. 0.1-1.0 wt % talc having an average particle size determined as $D_{50}$ according to ISO 9276-2 (2014) of 500-1500 nm;
with regard to the total weight of the polymer composition.

More particularly, the invention in one of its embodiments relates to a connector for connecting electric and electronic cables, the connector having a wall thickness of ≤0.5 mm, comprising a polymer composition comprising:
a. 80.0-90.0 wt % poly(butylene terephthalate) comprising 70.0-85.0 wt % of a first poly(butylene terephthalate) having an intrinsic viscosity of 0.70-0.80 dl/g, and 15.0-30.0 wt % of a second poly(butylene terephthalate) having an intrinsic viscosity of 1.15-1.40 dl/g;
b. 8.5-11.5 wt % glass fibres;
c. 1.5-10.0 wt % polyethylene; and
d. 0.1-1.0 wt % talc having an average particle size determined as $D_{50}$ according to ISO 9276-2 (2014) of 500-1500 nm;
with regard to the total weight of the polymer composition.

Even more particularly, the invention in one of its embodiments relates to a connector for connecting electric and electronic cables, the connector having a wall thickness of ≤0.5 mm, comprising a polymer composition comprising:
a. 80.0-90.0 wt % poly(butylene terephthalate) comprising 70.0-85.0 wt % of a first poly(butylene terephthalate) having an intrinsic viscosity of 0.70-0.80 dl/g, and 15.0-30.0 wt % of a second poly(butylene terephthalate) having an intrinsic viscosity of 1.15-1.40 dl/g;
b. 8.5-11.5 wt % glass fibres having an average fibre diameter of 5.0-15.0 μm, and an average fibre length of 3.0-5.0 mm;
c. 1.5-5.0 wt % polyethylene being a low-density polyethylene having a density of 918-922 kg/m$^3$ as determined in accordance with ISO 1183-1 (2012), method A, having a melt mass-flow rate determined at 190° C. under a load of 2.16 kg of ≥20.0 and ≤25.0 g/10 min, and a melt mass-flow rate determined at 190° C. under a load of 5.0 kg of ≥70.0 and ≤85.0 g/10 min; and
d. 0.1-1.0 wt % talc having an average particle size determined as $D_{50}$ according to ISO 9276-2 (2014) of 500-1500 nm;
with regard to the total weight of the polymer composition.

The invention will now be illustrated by the following non-limiting examples.

In a 25 mm twin-screw Krupp Werner & Pfleiderer ZSK-25 melt extruder, operated at a melt temperature of 260-270° C., a number of samples of polymer compositions were produced using the materials as listed in table I.

TABLE I

| Materials | |
|---|---|
| PBT1 | PBT 1100 211X, obtainable from Chang Chun Plastics, intrinsic viscosity 1.27 dl/g |
| PBT2 | PBT 1200 D, obtainable from Chang Chun Plastics, intrinsic viscosity 0.75 dl/g |
| PE | SABIC LDPE 1922N0, obtainable from SABIC, density 919 kg/m$^3$ |
| GF | PPG HP3786, obtainable from PPG Fiber Glass, average fibre diameter 10 μm, average fibre length 4.5 mm |
| AO | Zinc orthophosphate, CAS Reg. No. 7779-90-0 |
| Talc | Jetfine 3CA, obtainable from lmerys, average particle size $D_{50}$ of 1.0 μm |
| PB | Carbon black, CAS Reg. No. 1333-86-4 |
| MBS | Methylmethacrylate-butadiene-styrene copolymer, CAS Reg. No. 25053-09-2 |
| SAN | Styrene-acrylonitrile suspension copolymer, CAS Reg. No. 9003-54-7 |

The samples were produced according to the formulations in table II.

TABLE II

| formulations of sample polymer compositions | | | | | | | | | | | | |
|---|---|---|---|---|---|---|---|---|---|---|---|---|
| | C1 | S1 | S2 | C2 | S3 | C3 | S4 | C4 | C5 | C6 | C7 | C8 |
| PBT1 | 25.0 | 25.0 | 25.0 | 30.0 | 20.0 | 25.0 | 20.0 | 20.0 | 20.0 | 20.0 | 20.0 | 25.0 |
| PBT2 | 63.0 | 62.0 | 61.0 | 57.0 | 66.0 | 59.0 | 65.0 | 67.0 | 69.0 | 65.0 | 65.0 | 62.0 |
| PE | 1.0 | 2.0 | 3.0 | 2.0 | 3.0 | 3.0 | 4.0 | 4.0 | — | — | — | 2.0 |
| GF | 10.0 | 10.0 | 10.0 | 10.0 | 10.0 | 12.0 | 10.0 | 8.0 | 10.0 | 10.0 | 10.0 | 10.0 |
| AO | 0.06 | 0.06 | 0.06 | 0.06 | 0.06 | 0.06 | 0.06 | 0.06 | 0.06 | 0.06 | 0.06 | 0.06 |
| Talc | 0.2 | 0.2 | 0.2 | 0.2 | 0.2 | 0.2 | 0.2 | 0.2 | 0.2 | 0.2 | 0.2 | — |

TABLE II-continued

| | C1 | S1 | S2 | C2 | S3 | C3 | S4 | C4 | C5 | C6 | C7 | C8 |
|---|---|---|---|---|---|---|---|---|---|---|---|---|
| | | | | | formulations of sample polymer compositions | | | | | | | |
| Other IM | | | | | | | | | | 4.0 MBS | 4.0 SAN | |
| PB | 0.3 | 0.3 | 0.3 | 0.3 | 0.3 | 0.3 | 0.3 | 0.3 | 0.3 | 0.3 | 0.3 | 0.3 |

The values in table II present the parts by weight of the materials in the formulation of the polymer compositions.

Of the polymer compositions obtained, material properties were determined, the results of which are indicated in table III.

TABLE III

| | C1 | S1 | S2 | C2 | S3 | C3 | S4 | C4 | C5 | C6 | C7 | C8 |
|---|---|---|---|---|---|---|---|---|---|---|---|---|
| | | | | | properties of sample polymer compositions | | | | | | | |
| IV | 0.87 | 0.87 | 0.87 | 0.90 | 0.85 | 0.88 | 0.85 | 0.85 | 0.84 | 0.85 | 0.85 | 0.87 |
| TS | 2.8 | 3.4 | 3.4 | 3.4 | 3.4 | 3.3 | 3.5 | 3.4 | 2.7 | 3.5 | 2.5 | 3.5 |
| CNI | 4.9 | 4.9 | 4.4 | 4.7 | 4.6 | 5.1 | 4.5 | 4.0 | 4.6 | 4.6 | 3.8 | 4.7 |
| HDT | 187 | 181 | 185 | 183 | 186 | 190 | 184 | 160 | 186 | 177 | 174 | 177 |
| MVR | 26 | 26 | 25 | 22 | 29 | 21 | 30 | 31 | 27 | 22 | 26 | 27 |

Wherein:

IV is the intrinsic viscosity of the poly(butylene terephthalate), being in the presented examples a poly(butylene terephthalate) comprising PBT1 and PBT2, expressed in dl/g, determined in accordance with ASTM D2857-95 (2007) TS is the tensile strain at break as determined in accordance with ISO 527-1 (2012) at a speed of 5 mm/min, expressed in % strain. Tensile strain is sometimes also referred to as tensile elongation.

CNI is the Charpy notched impact strength determined in accordance with ISO 179 (2000) at 23° C., expressed in kg/m².

HDT is the heat deflection temperature as determined in accordance with ISO 75-2 (2013), method B, expressed in ° C.

MVR is the melt volume flow rate as determined in accordance with ISO 1133-1 (2011) at 250° C. at a load of 2.16 kg, expressed in cm³/10 min.

The above presented examples demonstrate the invention, in that the polymer composition according to the present invention provides a desired balance of tensile strain at break, melt volume flow rate, heat deflection temperature BS and Charpy notched impact strength, such as desired for the use in thin-walled automotive connector application.

The invention claimed is:

1. A connector for connecting electric and electronic cables, wherein the connector has a wall thickness of ≤0.5 mm and comprises a polymer composition, the polymer composition comprising:
   a. poly(butylene terephthalate);
   b. glass fibres; and
   c. 1.5-10.0 wt % polyethylene
   with regard to the total weight of the polymer composition.

2. The connector according to claim 1, comprising:
   a. 80.0-90.0 wt % poly(butylene terephthalate);
   b. 8.5-11.5 wt % glass fibres; and
   c. 1.5-10.0 wt % polyethylene
   with regard to the total weight of the polymer composition.

3. The connector according to claim 1, further comprising:
   d. 0.1-1.0 wt % talc having an average particle size determined as $D_{50}$ according to ISO 9276-2 (2014) of 500-1500 nm
   with regard to the total weight of the polymer composition.

4. The connector according to claim 1, wherein the poly(butylene terephthalate) comprises a first poly(butylene terephthalate) and a second poly(butylene terephthalate), wherein the first poly(butylene terephthalate) has an intrinsic viscosity of 0.70-0.80 dl/g and the second poly(butylene terephthalate) has an intrinsic viscosity of 1.15-1.40 dl/g, wherein the intrinsic viscosity is determined in accordance with ASTM D2857-95 (2007).

5. The connector according to claim 4, wherein the poly(butylene terephthalate) comprises 70.0-85.0 wt % of the first poly(butylene terephthalate), with regard to the total weight of the poly(butylene terephthalate).

6. The connector according to claim 4, wherein the poly(butylene terephthalate) comprises 15.0-30.0 wt % of the second poly(butylene terephthalate), with regard to the total weight of the poly(butylene terephthalate).

7. The connector according to claim 1, wherein the polyethylene is selected from a high-density polyethylene having a density of 940-970 kg/m³, a linear low-density polyethylene having a density of 915-939 kg/m³, or a low-density polyethylene having a density of 910-940 kg/m³, wherein the density is determined in accordance with ISO 1183-1 (2012), method A.

8. The connector according to claim 1, wherein the polyethylene is a low-density polyethylene having a density of 918-922 kg/m³ as determined in accordance with ISO 1183-1 (2012), method A.

9. The connector according to claim 1, wherein the polyethylene is a low-density polyethylene having a zero-shear viscosity as determined using DMS with fit according to the Cross-model of ≥15000 Pa·s.

10. The connector according to claim 1, wherein the glass fibres have an average fibre diameter of 5.0-15.0 μm, and an average fibre length of 3.0-5.0 mm.

11. The connector according to claim 1, wherein the poly(butylene terephthalate) comprises polymeric units derived from 1,4-butanediol and polymeric units derived from terephthalic acid or dimethyl terephthalate.

12. A connector for connecting electric and electronic cables, wherein the connector has a wall thickness of ≤0.5 mm and comprises a polymer composition, the polymer composition comprising
   a. 80.0-90.0 wt % poly(butylene terephthalate), wherein the poly(butylene terephthalate) comprises a first poly(butylene terephthalate) and a second poly(butylene terephthalate), wherein the first poly(butylene terephthalate) has an intrinsic viscosity of 0.70-0.80 dl/g and the second poly(butylene terephthalate) has an intrinsic viscosity of 1.15-1.40 dl/g, wherein the intrinsic viscosity is determined in accordance with ASTM D2857-95 (2007);
   b. 8.5-11.5 wt % glass fibres having an average fibre diameter of 5.0-15.0 μm, and an average fibre length of 3.0-5.0 mm; and
   c. 1.5-10.0 wt % polyethylene, wherein the polyethylene is selected from a high-density polyethylene having a density of 940-970 kg/m$^3$, a linear low-density polyethylene having a density of 915-939 kg/m$^3$, or a low-density polyethylene having a density of 910-940 kg/m$^3$, wherein the density is determined in accordance with ISO 1183-1 (2012), method A with regard to the total weight of the polymer composition.

13. The connector according to claim 12, further comprising:
   d. 0.1-1.0 wt % talc having an average particle size determined as $D_{50}$ according to ISO 9276-2 (2014) of 500-1500 nm
   with regard to the total weight of the polymer composition.

14. The connector according to claim 12, wherein the poly(butylene terephthalate) comprises 70.0-85.0 wt % of the first poly(butylene terephthalate), with regard to the total weight of the poly(butylene terephthalate), and 15.0-30.0 wt % of the second poly(butylene terephthalate), with regard to the total weight of the poly(butylene terephthalate).

15. The connector according to claim 12, wherein the polyethylene is a low-density polyethylene having a density of 918-922 kg/m$^3$ as determined in accordance with ISO 1183-1 (2012), method A and a zero-shear viscosity as determined using DMS with fit according to the Cross-model of ≥15000 Pa·s.

* * * * *